United States Patent [19]
Sander

[11] Patent Number: 4,589,291
[45] Date of Patent: May 20, 1986

[54] LOAD CELL WITH CENTRALLY LOCATED STRAIN GAUGE

[75] Inventor: Jörg Sander, Norderstedt, Fed. Rep. of Germany

[73] Assignee: U.S. Philips Corporation, New York, N.Y.

[21] Appl. No.: 537,891

[22] Filed: Sep. 30, 1983

[30] Foreign Application Priority Data

Oct. 2, 1982 [DE] Fed. Rep. of Germany ....... 3236532

[51] Int. Cl.⁴ .............................................. G01L 1/22
[52] U.S. Cl. ..................................... 73/862.65; 338/5
[58] Field of Search ................. 73/774, 775, 776, 781, 73/782, 862.65, 862.66; 338/2, 5

[56] References Cited

U.S. PATENT DOCUMENTS

| | | | |
|---|---|---|---|
| 2,550,588 | 4/1951 | Oberholtzer | 73/862.65 |
| 3,680,372 | 8/1972 | Ormond | 73/862.65 |
| 3,855,857 | 12/1974 | Claycomb | 73/151 |
| 4,079,624 | 3/1978 | Kurtz | 73/862.65 X |
| 4,148,219 | 4/1979 | Golding et al. | 73/862.65 |

OTHER PUBLICATIONS

Bethe et al., "Thin-Film Strain-Gauge Transducers"--Philps Tech. Rev. 39, 9114 101, 1980, No. ¾.
Ort-"The Latest in Foil Strain Gauges Versus, Thin Film Strain Gauges"-VDl-Berichte No. 313, 285-9, 1978.

Primary Examiner—Charles A. Ruehl
Attorney, Agent, or Firm—David R. Treacy

[57] ABSTRACT

The load cell, in particular for weighing systems, consists of a compressively loaded member which is provided with strain gauges. In order to prevent measurement errors caused by elevated temperatures or other environmental influences on the connection between said strain gauges and said member, the strain gauges are deposited on a separate support by means of thin-film techniques, and the support is welded to the center of the member.

2 Claims, 4 Drawing Figures

LOAD CELL WITH CENTRALLY LOCATED STRAIN GAUGE

BACKGROUND OF THE INVENTION

The invention relates to a load cell, in particular for weighing systems, which consists of a deformable member which is provided with strain gauges and which is preferably constructed as a compressively loaded member.

From published German patent application No. 27 25 559 load cells for weighing systems are known which utilize compressively loaded members comprising blind holes. Strain gauges are bonded to the flat bottom surfaces of the blind holes. However, the strength of the bond decreases at elevated temperatures so that deformation of the bottom surfaces is accompanied by a sliding motion of the strain gauges which, therefore, are no longer deformed to the same extent as the bottom surfaces. Because the strain gauges can no longer completely pick up the deformation of the bottom surfaces which is dependent of the applied force, the measurement result is falsified.

SUMMARY OF THE INVENTION

It is an object of the invention to provide a load cell, comprising a compressively loaded member with strain gauges, which operates correctly at elevated temperatures or other environmental influences on the connection between the strain gauges and said member.

This object is achieved in accordance with the invention in that the load cell comprises at least one separate support which is welded to the member and on which the strain gauges are deposited by thin-film techniques. The strength of welded joints is temperature independent to a high degree and not susceptible to environmental influences, so that the load cell will operate correctly in a large variety of different circumstances.

The loaded member is preferably provided with at least one bottomless or through bore which extends at right angles to the direction of the force, and in which at least one separate support is welded preferably centrically and at right angles to the axis.

The support in a preferred embodiment in accordance with the invention is formed so as to be disc-shaped because disc-shaped supports can be simply manufactured, for example, by punching from sheet metal or by turning.

When the support is welded to the member at its edges only along parts of its circumference, the thermal loading of the support during welding will be reduced. Because expensive welding methods, for example, microplasma welding or electron beam welding, are used for this purpose, a reduction of the welding area also results in a cost reduction.

In a preferred embodiment in accordance with the invention, the support is connected to the loaded member by way of bridge-like welding zones that extend in the direction of the applied force as well as transversely thereof. When a force is applied, the compression and the bulging of the member are thus transferred to the supports without falsification.

Some embodiments in accordance with the invention and their operation will be described in detail hereinafter with reference to the accompanying diagrammatic drawings.

DESCRIPTION OF THE PREFERRED EMBODIMENT

Figure 1:
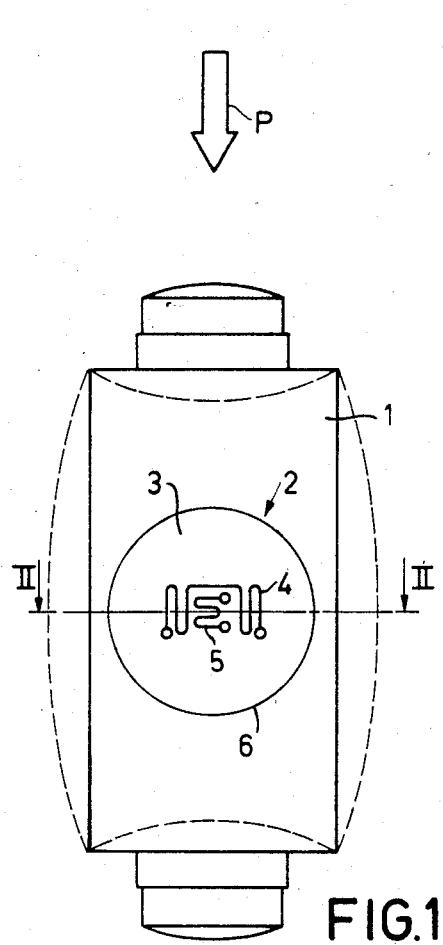
FIG. 1 is a side elevation of the compressively loaded member.

FIG. 1 shows a cylindrical compressively loaded member 1 with a through or bottomless bore 2 in which there is welded a disc-shaped, metallic support 3 for strain gauges 4 and 5. The welded seam 6 extends along the entire circumference of the support 3. The strain gauges 4 and 5 are vapour-deposited or sputtered onto the support 3. The support 3 may be connected to the member 1 by microplasma welding, electron beam welding or hard soldering.

When a force P is applied to the member 1, it is compressed in the direction of the force P and bulges in the direction perpendicular thereto. This deformation is denoted (exaggereated) by broken lines in FIG. 1. The deformation of the member 1 causes compression of the support 3 in the direction of the force P and expansion of the support 3 in the direction perpendicular to the force P. The compression of the support 3 reduces the resistance of the strain gauge 4, while the expansion of the support 3 increases the resistance of the strain gauge 5. The resistance variation of the strain gauges 4 and 5 is converted into an electrical measurement signal which is proportional to the force P by means of a processing circuit.

Figure 2:
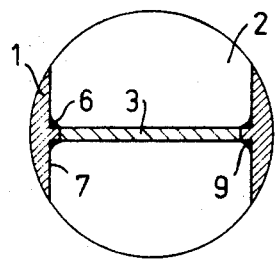
FIG. 2 is a sectional view taken along the line II—II.

FIG. 2 shows that the bore 2 in the member 1 centrically has a reduced diameter so that on the wall 7 an annular projection is formed for welding the support 3 to the member 1.

Figure 3:
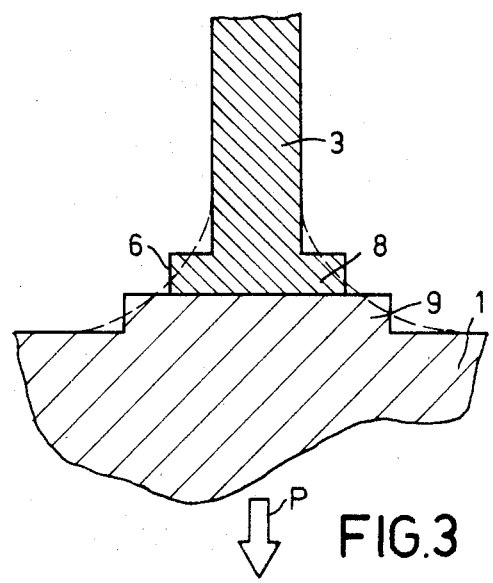
FIG. 3 shows a detail of FIG. 2 at an increased scale.

FIG. 3 shows a detail of FIG. 2 at an increased scale. The member 1 is welded to the disc-shaped support 1 by way of the projection 9 and the edge 8, so that a substantially smooth transition is obtained between the member 1 and the support 3. This transition may be shaped for example, as denoted by the broken lines in FIG. 3.

Figure 4:
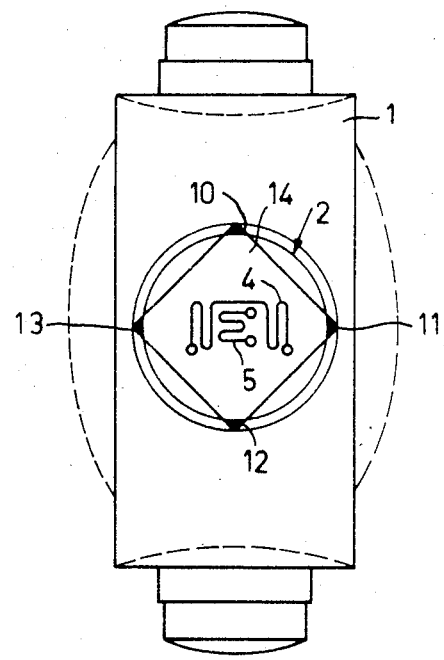
FIG. 4 is a side elevation of the compressively loaded member with a support which is welded thereto along a part of its circumference.

The support 14 in FIG. 4 is connected to the member 1 via the welded seams 10 and 12 which extend in the direction of the force as well as via the welding seams 11 and 13 which extend perpendicularly to the direction of the force. The compression is transferred via the welded seams 10 and 12 while the bulging (denoted by broken lines) of the member 1 is transferred to the support 14 via the welded seams 11 and 13. These deformations of the support are converted into electrical measurement signals by means of the strain gauges 4 and 5 and a processing circuit which is connected thereto.

The present embodiment involves metallic members and metallic supports. However, the member may alternatively be made of partly elastic ceramic materials or plastics in accordance with the relevant application. The support is then preferably made of the same or a similar material as the member. Welding is then to be understood to mean a permanent connection which is preferably formed by fusion of the materials or by the formation of an alloy at the area of the parts to be connected.

What is claimed is:
1. A load cell, comprising
   a deformable member which is symmetrical about a first axis, and is arranged to be loaded by a force in a direction along said first axis, and
   a strain gauge affixed to said member so as to sense deformation resulting from loading by such force,
   characterized in that said member has a through bore having a bore axis perpendicular to said first axis, and an annular projection extending into said bore in a plane perpendicular to said bore axis,
   the load cell comprises a separate disc-shaped support, having a circumference aligned with and welded to said annular projection at least at a plurality of points which are symmetrically arranged with respect to said first axis,
   said annular projection and support are arranged at the center of said bore along said first axis, and
   said strain gauge comprises at least one thin film formed on said support by thin-film deposition techniques.

2. A load cell as claimed in claim 1, characterized in that said disc is so welded to the projection as to form a smooth transition between the member and the support.

* * * * *